United States Patent Office 2,745,784
Patented May 15, 1956

2,745,784

11β,14α,17α,21-TETRAHYDROXYPROGESTERONE AND ESTERS THEREOF

Gilbert M. Shull, Huntington Station, Donald A. Kita, Jackson Heights, and Jacob W. Davisson, Levittown, N. Y., assignors to Chas. Pfizer & Co., Inc., Brooklyn, N. Y., a corporation of Delaware No Drawing. Application December 20, 1954,
Serial No. 476,556

9 Claims. (Cl. 167—65)

This invention is concerned with a novel steroid compound, 11β,14α,17α,21-tetrahydroxyprogesterone, which is formed when Reichstein's compound S is subjected to the oxygenating activity of a fungus from the genus Curvularia, and with novel derivatives of that compound.

This present application is a continuation-in-part of application Serial No. 415,972, filed on March 12, 1954, by Gilbert M. Shull et al., which in turn was a continuation-in-part of parent application Serial No. 322,578, filed on November 25, 1952. Another continuation-in-part thereof has issued as U. S. Patent No. 2,658,023.

In the above-mentioned earlier filed applications it was disclosed that 11β-hydroxy steroid compounds and in particular Kendall's compound F, 17-hydroxycorticosterone, may be prepared by subjecting 11-desoxy steroid compounds, particularly Reichstein's compound S, 11-desoxy-17-hydroxycorticosterone, to the oxygenating activity of selected cultures of microorganisms. Other products, referred to briefly in the earlier applications, are also obtained from this process, and it is with one of these other products that this present application is particularly concerned. Besides the compound which has been isolated and characterized herein, other compounds as yet uncharacterized are obtained.

The procedure for preparing compound F from compound S is described in detail in U. S. Patent No. 2,658,023, and that material is incorporated by reference as a part of this application. That procedure may be outlined as comprising contacting an 11-desoxy steroid, e. g. compound S, with the oxygenating activity of an organism chosen from the genus Curvularia, which genus belongs to the order Moniliales, of the class Fungi imperfecti. When this reaction is carried out, there is obtained a mixture of starting material and oxygenated steroids. It has been found that in addition to compound F there are formed certain derivatives of compound S having at least two added hydroxyl groups. The separation of these compounds (compound F, compound S and the polyhydroxylated derivatives) may readily be accomplished by means of a process comprising the steps outlined below.

A partition chromatography column is prepared from a mixture of silica gel and a lower alcohol, for example ethanol. To this column is applied the crude biooxygenation mixture dissolved in a non-polar organic solvent, the chlorinated lower hydrocarbons such as chloroform, methylene chloride, dichloroethane and propylene chloride being especially useful. The adsorbed mixture is then separated into its components and eluted by the gradual addition of mixtures of the non-polar solvent with increasing amounts of a polar solvent such as a low molecular weight alcohol.

As the amount of polar solvent in the eluting mixture is gradually increased, a typical mixture of steroids is freed from the column in the following order:

(1) Unreacted compound S (2) A steroid here called LP-3 which is less polar than compound F
(3) A steroid as yet uncharacterized which we call LP-2
(4) A steroid here called LP-1 which is less polar than compound F
(5) Compound F
(6) A steroid here called MP-1 which is more polar than compound F
(7) Three more steroids as yet uncharacterized The letters LP and MP are derived from the words less polar and more polar, respectively. The order of polarity of these compounds may vary with various solvent-adsorbent systems.

The unreacted compound S and the compounds less polar than compound F are removed from the column when the eluting agent contains, for instance, about 2–4% ethanol (by volume) in methylene chloride. If the partition chromotography is continued using about 5% ethanol (by volume) in methylene chloride, compound F and then the more polar compounds are eluted. A check may be kept upon the process by submitting samples of the eluted materials to paper chromatography tests, comparing the eluted materials to known samples used as controls.

The solutions, each containing a dissolved steroid, which are recovered from the chromatography column, are evaporated to dryness, and the solid steroids recovered therefrom. It has been found that MP-1, the product with which this application is primarily concerned, may be obtained as pure crystals by recrystallizing it from a solution using a low molecular weight, polar, organic solvent, such as methanol or acetone.

The compound MP-1 has been shown to be 11β,14α,-17α,21-tetrahydroxyprogesterone. It may also be called 14α-hydroxy-compound F or 14α-hydroxyhydrocortisone. The formation of this product is unprecedented, for while other organisms have been reported in the literature as introducing 11β-hydroxyl groups, and still other organisms have been reported to introduce 14α-hydroxyl groups, the introduction of both an 11β-hydroxyl and a 14α-hydroxyl by the one organism is unique.

As the 21-position hydroxyl group is the only primary alcohol group in the MP-1 molecule, it may readily be etherified and esterified by standard methods. For example, the methyl, ethyl, benzyl and methoxymethyl ethers were formed, as were a variety of esters of both monocarboxylic and polycarboxylic acids, including those with straight, branched, saturated, unsaturated and cyclic chains. This gives rise to a group of compounds having the generic formula

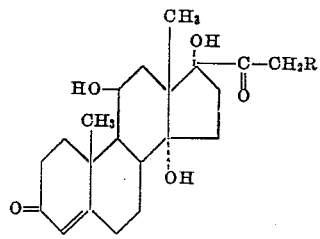

where R is selected from the group consisting of an hydroxyl group, an ester group and an ether group.

Esters of MP-1 may be prepared from MP-1 by any one of the known esterification procedures which do not involve the use of agents that are deleterious to the stability of MP-1. Thus the acid chloride of the preferred acid may be used particularly in the presence of an organic base such as pyridine, dimethylaniline and the like. The novel esters of the present invention may also be prepared from MP-1 by treatment of said steroid with at least about one molecular proportion of an acid or an acid acylating agent such as an acid anhydride or ester of a low molecular weight alcohol. In the latter case esterification of the $C_{21}$ hydroxy group takes place by alcoholysis of the ester by means of the $C_{21}$ steroid alcohol. Not only may the free $C_{21}$ steroid alcohol be used as starting material for this process but lower molecular weight aliphatic acid esters of MP-1 may also be used; thus, for instance, MP-1 acetate may be utilized for this purpose. Treatment of that compound with, for example, a polycarboxylic acid or a polycarboxylic acid-low molecular weight alcohol ester results in an exchange producing the desired $C_{21}$ steroid alcohol ester of a polycarboxylic acid. The alcohol or ester by-product must be removed to complete the reaction.

The esterification process may be catalyzed by such materials as ion-exchange resins, minor proportions of strong acids or alkalies, either organic or inorganic; however, care must be exercised since certain sensitive groups are present in the molecule, such as the hydroxyl group at the 11-position in the $\beta$ configuration, and the hydroxyl group in the 14$\alpha$-position. The use of catalytic amounts of a base or acid for speeding the esterification process is, of course, not necessary when an acylating agent such as an acid anhydride or an acid halide is used for the operation of the process. The agents of this latter group may be utilized in the presence of an organic base such as pyridine, dimethylaniline, quinoline, etc.

It should be noted that a variety of acids may be utilized for the present process either as the acids, as esters with lower molecular weight alcohols, or in the form of acid anhydrides or acid halides. Such reagents include compounds such as acetic anhydride, the acid halides of propanoic, butanoic, pentanoic, hexanoic, heptanoic, octanoic, nonanoic, decanoic, ortho-toluic, benzoic, 1-ethylcyclohexane carboxylic, cylohexane carboxylic, and 1-methyl-cyclopropane carboxylic acids, maleic anhydride, glutaric anhydride, phthalic anhydride, phthaloyl chloride, malic acid, citric acid, tartaric acid, succinic anhydride, pyromellitic acid, etc. As noted above, 14$\alpha$-hydroxy-hydrocortisone possesses in its structure sensitive groups, and it is advisable to use care in the esterification of such compounds. The use of an acid anhydride or acid halide in an organic base is a particularly favorable method. It should be noted that the reaction is selective in that only the primary alcohol group in the $C_{21}$ position is esterified, and other groups such as the 11$\beta$-hydroxyl group and 14$\alpha$-hydroxyl group are not esterified to any appreciable extent in the present process. In operating the process, it is advisable to use a solvent, if an organic base such as pyridine is not used for this purpose. Inert organic solvents, such as benzene, chloroform, toluene, etc. may be used. The application of heat often assists in speeding the reaction to its completion; however, this must be used with care and if an acid chloride, for instance, is used as the esterifying agent, caution must be observed. When a lower alcohol-carboxylic acid ester and MP-1 alcohol are used as the reactants or when a transesterification process is utilized for the preparation of the present esters, the by-product, which is volatile, may be removed from the reaction mixture to induce completion of the reaction. This may be effected by applying gentle heat and vacuum to the reaction mixture.

By these methods there are obtained 21-position esters of MP-1 with monocarboxylic acids containing only the elements hydrogen, oxygen and carbon, and having a carbon content of from 1 to 10 carbon atoms inclusive, and 21-position acid esters of MP-1 and of polycarboxylic acids containing only the elements hydrogen, oxygen and carbon, and having a carbon content of from 2 to 10 carbon atoms inclusive.

When MP-1 is esterified with a polycarboxylic acid, for instance a dibasic acid such as succinic acid, there is obtained an acid ester, i. e. an ester having one or more free carboxyl groups. Alkali metal and ammonium salts of these compounds, for example, the sodium salt of MP-1 succinate, have the advantage of being water soluble. These salts are obtained by treating the acid ester with equivalent amounts of base, or salts of weak acids, such as sodium bicarbonate.

Most significantly, it has been shown that MP-1 gives a positive liver glycogen test and a positive thymus involution test. These are standard tests which prove the presence of cortical activity, and this compound and its 21-position hydroxyl derivatives have been shown to possess activity equivalent to that of the very valuable compound F (hydrocortisone).

Both 11$\beta$,14$\alpha$,17$\alpha$,21-tetrahydroxyprogesterone and its 21-acetate have been studied clinically by several independent investigators. The compounds were used to treat a variety of disease conditions ordinarily treated with hydrocortisone or hydrocortisone acetate, for example, rheumatoid arthritis, vernal conjunctivitis and other types of inflammation of the eye, and certain dermatological disorders. The compounds of this invention were found to be approximately equivalent in activity to hydrocortisone or hydrocortisone acetate. The compounds of this invention also possessed distinct advantages over corresponding hydrocortisone compounds in their freedom from side effects, particularly those concerned with salt and water metabolism and the development of androgenicity.

The compounds of this invention are found suitable for administration to patients as components of therapeutic compositions the make-up of which is determined by the solubility of the particular compound, by standard practices of pharmacology and by the chosen route of administration. In general, the daily dosage of the compounds of this invention, alone or with an acceptable pharmaceutical carrier, is of the same order of magnitude as is the case with corresponding hydrocortisone compounds. Oral preparations, such as tablets employing compatible excipients can be used, as can elixirs containing flavoring and sweetening agents. Aqueous suspensions or solutions can be used for intra-articular injection, and oil solutions can be employed intra-muscularly. For topical administration ointment bases are satisfactory, as are aqueous suspensions for ophthalmic use.

The following examples are given solely for the purposes of illustration and are not to be construed as limitations of this invention, many variations of which are possible without departing from the spirit or scope thereof.

EXAMPLE I

*Fermentation and separation*

Compound S was treated as described in Example III of the above mentioned U. S. Patent No. 2,658,023, with the mycelium from a culture of *Curvularia lunata* (Q. M. 120 h) grown as described therein. (A living culture of this organism has been deposited with the Fermentation Division of the Northern Regional Research Laboratory at Peoria, Illinois, and has been added to its permanent collection of microorganisms as NRRL-2380.) The combined chloroform extracts of the reaction mixture, obtained as described in that example, were evaporated to dryness, and a dry mixture of steroids was obtained. This reaction was repeated several times, and one gram of the produced dry mixture of steroids was used in this present example.

37 gms. of silica gel (20-200 mesh) was mixed with 37 ml. of 95% ethanol and the resulting slurry was transferred with methylene chloride into a glass column 20 cm. high and 2 cm. in inside diameter. One gram of the crude dry mixture of steroids, obtained as described above, was dissolved in 5 ml. of chloroform and applied to the column. The column was washed with 200 ml. of chloroform and then developed. The solvent for the developing consisted of mixtures of methylene chloride and 95% ethanol. The ratio of methylene chloride to ethanol started out as 98:2 on a volume basis, and at the end was up to 95:5, to remove the more polar compounds.

A fraction of eluate, having a volume of about 50 ml., was collected every two hours. Compound S was recovered in fractions 3–5. Compound LP-3 was recovered in fractions 6–8. A compound as yet uncharacterized was found in fraction 9. Fractions 10–12 contained LP-1, and fractions 13–26 contained compound F. Compound MP-1 was found in fractions 27–30. Mixtures of as yet uncharacterized compounds were found in subsequent fractions. These may be separated by further chromatography.

EXAMPLE II

Properties of MP-1

An analytical sample of MP-1, twice recrystallized from methanol, exhibited the following properties: M. P. 231.6–233.4° C.; optical rotation $$[\alpha]_D^{EtOH} +188.4°, [\alpha]_{Hg}^{EtOH} +215.4°$$

ultraviolet adsorption $$\epsilon_{243}^{EtOH} 15,850$$

Analysis: Calculated for $C_{21}H_{30}O_6 \cdot \frac{1}{2}CH_3OH$: C, 65.46; H, 8.18. Found: C, 65.28; H, 8.13.

The alcohol of crystallization was removed by heating at 100° C. under vacuum. The compound then had the following physical constants: M. P. 241–242° C.; optical rotation $$[\alpha]_D^{EtOH} +182.6°, [\alpha]_D^{dioxane} +151.9°$$

ultraviolet adsorption $$\lambda_{max}^{EtOH} 241$$

log ε4.23. Analysis: Calculated for $C_{21}H_{30}O_6$: C, 66.64; H, 7.99. Found: C, 66.53; H, 7.93.

The behavior of this compound on paper chromatography indicated that it is a derivative of compound S containing two added hydroxyl groups, and the formula $C_{21}H_{30}O_6$ is consistent with this belief. Additional investigations of MP-1, including molecular rotation calculations, infrared studies, and degradation, have shown its structure to be 11β,14α,17α,21-tetrahydroxyprogesterone, having the following structure:

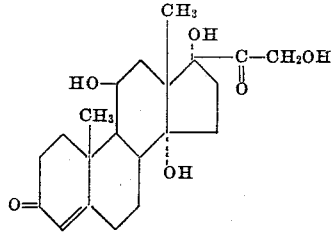

EXAMPLE III

Properties of MP-1 acetate

MP-1 was treated with a molecular equivalent of actic anhydride in pyridine solution at room temperature. The monoacetate was formed. Following recrystallization from methanol, this compound had the following physical constants: M. P. 212–213° C.; optical rotation $$[\alpha]_D^{dioxane} +179.1°; \epsilon_{241}^{EtOH} 16,200$$

acetyl determination, found 9.89, calculated for 1 acetyl group 10.19. Analysis: Calculated for $C_{23}H_{32}O_7 \cdot CH_3OH$: C, 63.70; H, 8.01. Found: C, 63.83; H, 8.09.

The alcohol of crystallization was removed by heating under vacuum at 100° C. The compound then had the following physical constants: M. P. 211–212° C.; optical rotation $$[\alpha]_D^{EtOH} +147.5°, [\alpha]_D^{dioxane} +142.5°$$

ultraviolet adsorption $$\lambda_{max}^{EtOH} 241$$

log ε4.19. Analysis: Calculated for $C_{23}H_{32}O_7$: C, 65.69, H, 7.67. Found: C, 65.68, H, 7.70.

This compound is therefore 11,β14α,17α,21-tetrahydroxyprogesterone-21-acetate. It also possesses very great cortical activity.

EXAMPLE IV

Preparation of MP-1 formate 0.5 gram of MP-1 was added to 1 gram of anhydrous formic acid in 15 ml. of benzene, and the mixture was stirred for 2 hours at room temperature. It was then cooled, and poured into cold water. The benzene layer was removed, dried over anhydrous magnesium sulfate and evaporated to dryness. The residue was purified by recrystallization and shown to be the 21-position formate ester of MP-1.

EXAMPLE V

Preparation of MP-1 propionate

Propionyl chloride (7 millimoles) was added to a solution of 5 millimoles of MP-1 dissolved in 5 ml. of pyridine. The solution was stirred and cooled in ice until heat evolution had subsided. The mixture was then allowed to stand overnight at room temperature. It was poured into 50 ml. of ice cold 3N sulfuric acid. The mixture was extracted twice with two 50 ml. portions of chloroform. The combined extracts were washed with 1N sulfuric acid, with saturated aqueous sodium bicarbonate solution and then with water. The chloroform solution was then filtered through a diatomaceous earth filter and was evaporated to dryness. The residue was triturated with ether, and the residual undissolved material was dried. This dried product was identified as the 21-position propionate ester of MP-1.

By similar reactions, using either the acid chloride or the acid anhydride of the acid, esters of MP-1 and of each of a wide variety of organic carboxylic acids were prepared. These included, for example, the esters of butyric acid, valeric acid, caproic acid, heptoic acid, caprylic acid, nonylic acid and capric acid. The acids had both straight and branched carbon chains. They may also be unsaturated. In all cases the reaction was analogous to that given above. By this method, there were readily prepared esters of MP-1 and of monocarboxylic acids containing only the elements hydrogen, oxygen and carbon, the carbon content being from 2 to 10 atoms inclusive.

EXAMPLE VI

Preparation of esters of cyclic acids

Ortho-toluyl chloride (6.6 millimoles) was added to a solution of 5.5 millimoles of 14α-hydroxy-hydrocortisone dissolved in 5 ml. of pyridine. The solution was stirred and cooled in ice until the heat evolution had subsided. The mixture was then allowed to stand 20 hours at 25° C. It was poured into 50 ml. of ice cold 3N sulfuric acid. The mixture was extracted twice with two 50 ml. portions of chloroform. The combined extracts were washed with 1N sulfuric acid, with saturated aqueous sodium bicarbonate solution and then with water. The chloroform solution was then filtered through a diatomaceous earth filter aid and was evaporated to dryness. The residue was triturated with ether, and the residual undissolved material was dried. This dried product was then purified by recrystallization from isopropyl alcohol, and identified as 14α-hydroxy-hydrocortisone ortho-toluate.

By analogous procedures, using the corresponding acid chloride in each case, the benzoate, 1-ethylcyclohexane carboxylate, cyclohexane carboxylate and 1-methylcyclopropane carboxylate esters of MP-1 were also prepared. These cyclic esters, particularly those formed from acids wherein the carbon atom adjacent to the carboxyl group is a member of a hydrocarbon ring having from three to six carbon atoms, are particularly valuable since they exhibit prolonged therapeutic activity.

EXAMPLE VII

*Preparation of acid esters of polycarboxylic acids*

A solution of 3 grams of 14α-hydroxy-hydrocortisone in 12 ml. of pyridine was treated with 1.2 grams of phthalic anhydride. The mixture was allowed to stand at room temperature for 18 hours, and it was then poured into 150 ml. of ice cold 2 N sulfuric acid. During the addition to the sulfuric acid, the mixture was rapidly stirred. A white solid product separated and was filtered from the aqueous solution. It was washed repeatedly with small portions of water and then with a solution of methanol in water. The product was then dried under vacuum, and purified by recrystallization from ethanol. Analysis showed it to be the acid ester, 14α-hydroxy-hydrocortisone hemiphthalate.

A solution of 3 grams of 14α-hydroxy-hydrocortisone in 15 ml. of quinoline was treated with 1 gram of succinic anhydride. After being stirred overnight at room temperature, the mixture was poured with stirring into 200 ml. of ice cold 2 N sulfuric acid. The precipitate was filtered, washed repeatedly with water and dried under vacuum. It was then recrystallised from alcohol. Analysis showed it to be 14α-hydroxy-hydrocortisone hemisuccinate.

EXAMPLE VIII

*Preparation of salts of acid esters of polycarboxylic acids*

A gram and a half of 14α-hydroxy-hydrocortisone succinate was dissolved in 15 ml. of water containing an equi-molecular amount of sodium bicarbonate. The mixture was stirred and gently warmed, and then placed under vacuum for a short time to remove carbon dioxide. The solution of the sodium salt was frozen and dried under vacuum from the frozen state. The product, the sodium salt of 14α-hydroxy-hydrocortisone succinate was quite soluble in water and suitable for use in the form of an aqueous solution for injection. Saline may be used to form an isotonic solution for this purpose if desired, and so may glucose.

EXAMPLE IX

*Preparation of MP-1 tablets*

As mentioned above, the compounds of this invention may be administered alone or in combination with other compatible materials. This example and the following examples illustrate some of these therapeutic compositions in which MP-1 is a principal active ingredient.

The following is a typical composition of a tablet suitable for oral administration:

| | Milligrams/tablet |
|---|---|
| MP-1 | 20 |
| Calcium phosphate (diabasic) | 150 |
| Milk sugar | 60 |
| Potato starch | 35 |
| Magnesium stearate | 5 |
| Magnesium trisilicate | 30 |

EXAMPLE X

*M-1 acetate topical ointment*

The formula for a typical composition in which MP-1 acetate is administered topically is as follows:

| | Milligrams |
|---|---|
| MP-1 acetate | 25 |
| Sodium lauryl sulfate U. S. P. | 10 |
| Propylene glycol U. S. P. | 115 |
| Stearyl alcohol | 80 |
| Cetyl alcohol (N. F.) | 70 |
| Cholesterol U. S. P. | 45 |
| White petrolatum U. S. P. | 190 |
| Mineral oil U. S. P. | 50 |
| Water | 400 |
| Methyl paraben | 1.0 |
| Propyl paraben | 0.02 |

EXAMPLE XI

*MP-1 acetate for intra-articular injection*

The following is a typical composition of MP-1 acetate, used for intra-articular injection:

| | Grams |
|---|---|
| MP-1 acetate | 25 |
| Sodium chloride U. S. P. | 9 |
| Sodium carboxymethylcellulose | 5 |
| Methocel 15 | 1 |
| Tween 80 U. S. P. | 1.9 |
| Methyl paraben | 2.4 |
| Propyl paraben | 0.26 |
| Water, q. s. to make 1000 ml. | |

EXAMPLE XII

*MP-1 acetate ophthalmic suspension*

A typical composition suitable for ophthalmic use is as follows:

| | Grams |
|---|---|
| MP-1 acetate | 25.00 |
| Sodium carboxymethylcellulose | 27.75 |
| Polyvinyl pyrrolidone | 3.00 |
| Benzyl alcohol U. S. P. | 9.00 |
| Polysorbate U. S. P. | 0.46 |
| Water | 951.25 |

What is claimed is:

1. A compound selected from the group consisting of 11β,14α,17α,21-tetrahydroxyprogesterone, a 21 ester thereof with a hydrocarbon monocarboxylic acid containing only the elements hydrogen, oxygen and carbon and having a carbon content of from 1 to 10 carbon atoms inclusive, a 21 acid ester of said steroid carbinol with a hydrocarbon polycarboxylic acid containing only the elements hydrogen, oxygen and carbon and having a carbon content of from 2 to 10 carbon atoms inclusive, and a salt selected from the group consisting of the alkali metal, and ammonium salts of said acid esters.

2. 11β,14α,17α,21-tetrahydroxyprogesterone.

3. 11β,14α,17α,21-tetrahydroxyprogesterone-21-acetate.

4. 11β,14α,17α,21-tetrahydroxyprogesterone-21-hemisuccinate.

5. 11β,14α,17α,21-tetrahydroxyprogesterone-21-sodium succinate.

6. 11β,14α,17α,21-tetrahydroxyprogesterone-21-benzoate.

7. A therapeutic composition consisting of a pharmaceutical carrier and a compound as claimed in claim 1.

8. A therapeutic composition consisting of a pharmaceutical carrier and 11β,14α,17α,21-tetrahydroxyprogesterone.

9. A therapeutic composition consisting of a pharmaceutical carrier and 11β,14α,17α,21-tetrahydroxyprogesterone-21-acetate.

(References on following page)

References Cited in the file of this patent

UNITED STATES PATENTS

| | | |
|---|---|---|
| 2,658,023 | Shull | Nov. 3, 1953 |
| 2,662,089 | Murray | Dec. 8, 1953 |
| 2,670,358 | Murray | Feb. 23, 1954 |
| 2,673,866 | Murray | Mar. 30, 1954 |
| 2,688,030 | McNiven | Aug. 31, 1954 |
| 2,702,812 | Shull | Feb. 22, 1955 |

FOREIGN PATENTS

| | | |
|---|---|---|
| 299,367 | Switzerland | Aug. 16, 1954 |
| 299,703 | Switzerland | Sept. 1, 1954 |
| 1,014,032 | France | May 21, 1952 |